(12) United States Patent
Knobloch et al.

(10) Patent No.: US 7,559,701 B2
(45) Date of Patent: Jul. 14, 2009

(54) HIGH-TEMPERATURE PRESSURE SENSOR AND METHOD OF ASSEMBLY

(75) Inventors: Aaron Jay Knobloch, Mechanicville, NY (US); David Mulford Shaddock, Troy, NY (US); David Richard Esler, Mayfield, NY (US); Marco Francesco Aimi, Niskayuna, NY (US); Douglas S. Byrd, Greer, SC (US); David Robert O'Connor, Mississauga (CA); Stacey Joy Kennerly, Albany, NY (US)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 11/687,931

(22) Filed: Mar. 19, 2007

(65) Prior Publication Data

US 2008/0232745 A1   Sep. 25, 2008

(51) Int. Cl.
*G02B 6/36* (2006.01)
*G01B 9/02* (2006.01)

(52) U.S. Cl. .......................................... 385/88; 356/454

(58) Field of Classification Search .................... 385/88
See application file for complete search history.

(56) References Cited

U.S. PATENT DOCUMENTS

| | | | |
|---|---|---|---|
| 4,334,974 A * | 6/1982 | Muller et al. ............... | 204/425 |
| 4,360,272 A | 11/1982 | Schmadel et al. | |
| 4,688,940 A | 8/1987 | Sommargren et al. | |
| 4,714,342 A | 12/1987 | Jackson et al. | |
| 4,933,545 A * | 6/1990 | Saaski et al. ........... | 250/227.14 |
| 4,942,767 A | 7/1990 | Haritonidis et al. | |
| 4,948,219 A * | 8/1990 | Seino et al. .................... | 385/95 |
| 5,128,537 A * | 7/1992 | Halg ...................... | 250/231.19 |
| 5,129,025 A * | 7/1992 | Loftus et al. ................... | 385/88 |
| 5,179,424 A | 1/1993 | Lequime et al. | |
| 5,200,796 A | 4/1993 | Lequime | |
| 5,202,939 A | 4/1993 | Belleville et al. | |
| 5,206,924 A | 4/1993 | Kersey | |
| 5,349,439 A | 9/1994 | Graindorge et al. | |
| 5,442,665 A * | 8/1995 | Dalke .......................... | 376/245 |
| 5,619,046 A | 4/1997 | Engstrom et al. | |
| 6,122,971 A | 9/2000 | Wlodarczyk | |
| 6,738,145 B2 * | 5/2004 | Sherrer et al. ............... | 356/480 |
| 6,842,254 B2 | 1/2005 | Van Neste et al. | |
| 2003/0107491 A1 * | 6/2003 | Sasaki et al. ................. | 340/626 |
| 2005/0172721 A1 * | 8/2005 | Daigle .......................... | 73/705 |

* cited by examiner

*Primary Examiner*—Uyen Chau N Le
*Assistant Examiner*—Kajli Prince
(74) *Attorney, Agent, or Firm*—Mardson McQuay; Global Patent Operation

(57) ABSTRACT

A method for assembling a Fabry-Perot interferometer includes depositing a first metal layer on an end portion of a ferrule, depositing a second metal layer on a back portion of a die, placing the first metal layer and the second metal layer in contact with each other with respective first and second orifices aligned with respect to each other, and bonding the ferrule to the die by thermo compression. The resulting interferometer includes a glass die with a cavity, a silicon diaphragm disposed over the opening of the cavity and bonded to the glass die, a ferrule bonded to the glass die by thermo compression with the first and second orifices being aligned to each other, and an optical fiber inserted through the other end of the ferrule in direct contact to a back portion of the die and aligned with the first orifice.

22 Claims, 5 Drawing Sheets

HIGH-TEMPERATURE PRESSURE SENSOR AND METHOD OF ASSEMBLY

BACKGROUND OF THE INVENTION

1. Field of the Invention

The present invention relates in general to sensors and, more particularly, to a fiber-optic pressure sensor for use in hostile environments and methods of packaging the pressure sensor.

2. Description of the Related Art

In many engineering applications an accurate determination of both static and dynamic pressures is needed for optimized performance as well as the early detection of undesirable operating conditions. Consider, as an example, but not a limitation, the fact that in gas turbine and/or aircraft engines, overall efficiency is directly related to the maximum pressure in the cycle and compressor performance in such engines may be affected by sudden changes in pressure, particular during off-design performance. In internal combustion engines, engine knock and misfire are two undesirable phenomena directly related to pressure inside the cylinder of the engine where pressure measurements may be directly related to the overall engine performance. As such, the ability to monitor continuously pressure fluctuations may significantly improve engine efficiency, performance, reliability and operating costs as well as permit lean-burn engine operations, a wider tolerance to fuel octane, and acceptance of alternative fuels. Harsh environments characterize the operating conditions in these engines, among many other applications, where corrosive conditions, elevated temperatures, and electromagnetic interference, or EMI, make it difficult for the proper use of electrical pressure probes, such as piezoelectric sensors. This is so because piezoelectric pressure transducers are limited due to signal variation caused by temperature and electromagnetic interference and dynamic response limitations caused by the need for the use of an intermediate interface between the environment and the sensing element. Furthermore, signal amplification electronics cannot be located near the sensing element in these harsh environments.

An optical interface between the sensor and a signal conditioner is more robust in the above-mentioned harsh environments and does not require closely coupled electronics that have high-temperature limitations. However, one of the challenges of making a high-temperature optical dynamic pressure sensor is the development of an assembly, or packaging, that can survive elevated temperatures and minimally affect the sensor output. One example of such optical devices is a Fabry-Perot interferometer, which is a fiber optic sensor sensitive to pressure or stress in a manner that causes a beam of light to be reflectively modulated in response to changes in pressure or stress on the sensor. The spectral response of an optical interferometer is a periodic function having a sinusoidal shape, the period of which is inversely proportional to differences in the optical path of the sensor. Thus, measured changes in light modulation are measured and correlated with changes in flow variables of interest, such as, for example, pressure and temperature.

Optical interferometers are known devices that have been used to detect a variety of physical parameters, as shown, for example, in U.S. Pat. No. 4,360,272 (Schmadel et al.), U.S. Pat. No. 4,714,342 (Jackson et al.), U.S. Pat. No. 4,942,767 (Haritonidis et al.), U.S. Pat. No. 4,688,940 (Sommargren et al.), U.S. Pat. No. 5,179,424 (Lequime et al.), U.S. Pat. No. 5,200,796 (Lequime), U.S. Pat. No. 5,202,939 (Belleville et al.), U.S. Pat. No. 5,206,924 (Kersey), U.S. Pat. No. 5,349, 439 (Graindorge et al.), U.S. Pat. No. 5,619,046 (Engstrom et al.), U.S. Pat. No. 6,122,971 (Wlodarczyk), and U.S. Pat. No. 6,842,254 (Van Neste et al.).

However, the application of optical interferometers to high-temperature, harsh environments has been limited due to difficulties associated with packaging and reliability. For example, due to variations in coefficient of thermal expansion of the different materials used, the stress state of optical cavities in conventional interferometers are significantly affected by temperature, causing unwanted changes in optical cavity dimensions and a high level of measurement uncertainty. In addition, because of the difficulty in eliminating the relative motion of the fiber optic with respect to the optical cavity, additional undesired spectral signals are generated in the gaps between the fiber optic cable and the cavity, thus generating noise in the measured signal. Furthermore, given the high-temperature environment in the industrial applications sought herein, conventional devices are made of materials that would simply not survive in environments in which the average temperature of the sensor may exceed 350° C. and peak temperatures may be much higher. Furthermore, high temperature accelerates oxidation and corrosion of the packaging materials in the presence of contaminates from the environment and combustion by-products, such as sulfur, thus limiting the reliable functioning of the sensor, and diffusion of metals that lead to brittle intermetallic compounds and failure.

Therefore, based at least on the foregoing summarized discussion, a need exist for a fiber optical pressure sensor with simple optics capable of reliable operation in high-temperature environments. Among other advantageous features, the fiber optical pressure sensor and associated packaging method disclosed herein provide a sensor that is small and light weight so as to allow accessibility and use in harsh environments with high levels of temperature and heat radiation, passive (i.e., non-electrical) data collection, and high sensitivity and frequency response.

BRIEF DESCRIPTION OF THE INVENTION

One or more of the above-summarized needs and others known in the art are addressed by a Fabry-Perot interferometers that include a glass die having a body containing a cavity and a first metal layer disposed on a back portion thereof having an orifice; a diaphragm disposed over the opening of the cavity, the diaphragm being bonded to the glass die; a ferrule having a second metal layer with a second orifice, the ferrule being bonded to the glass die with the first orifice aligned with the second orifice; and an optical fiber having an end portion inserted through the other end of the ferrule, the end portion of the optical fiber being disposed directly adjacent to the back portion of the die and aligned with the first orifice.

Methods for assembling a Fabry-Perot interferometer are also within the scope of the embodiments of the invention disclosed, such methods including the steps of depositing a first metal layer on an end portion of a ferrule, the first metal layer having a first orifice; depositing a second metal layer on a back portion of a die, the second metal layer having a second orifice; placing the first metal layer and the second metal layer in contact with each other and aligning the first and second orifices with respect to each other; and bonding the ferrule to the die.

The above brief description sets forth rather features of the present invention in order that the detailed description that follows may be better understood, and in order that the present contributions to the art may be better appreciated.

There are, of course, other features of the invention that will be described hereinafter and which will be for the subject matter of the appended claims.

In this respect, before explaining several preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
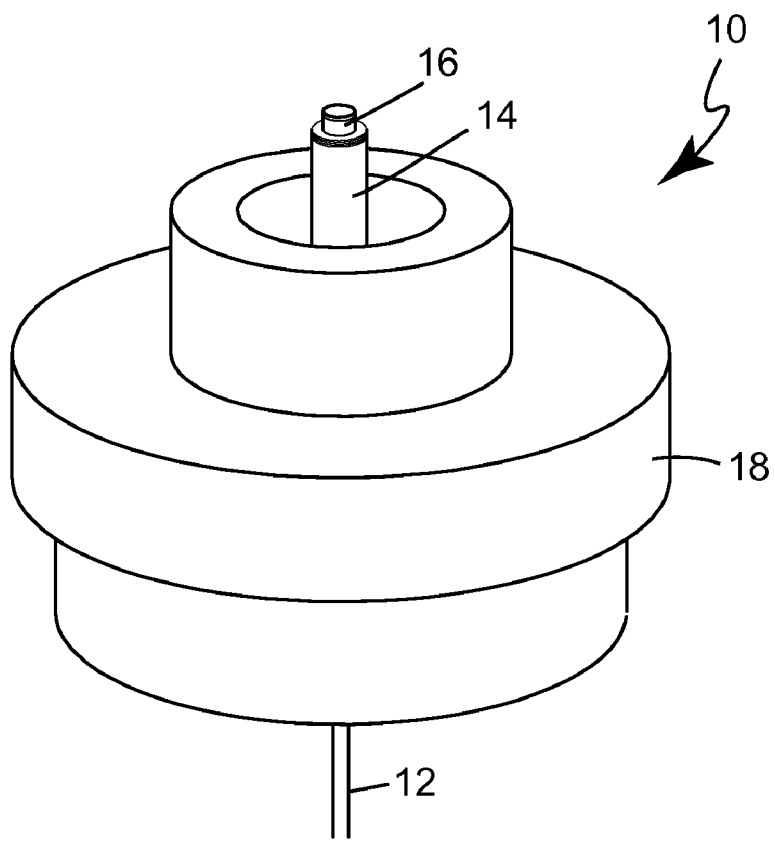
FIG. 1 illustrates a perspective view of a pressure sensor in accordance with the embodiments of the disclosed invention.
Figure 2:
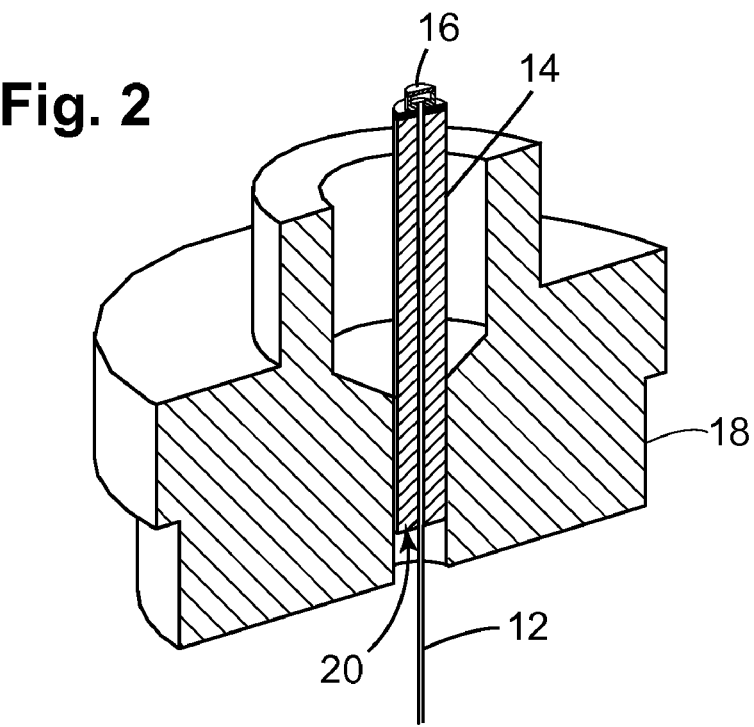
FIG. 2 illustrates a perspective cut of FIG. 1.

Referring now to the drawings, wherein like reference numerals designate identical or corresponding parts throughout the several views, several embodiments of the optical pressure sensor and methods of assembly of same in accordance with the disclosed invention will be described. FIG. 1 illustrates a perspective view of a pressure sensor 10 in accordance with the embodiments of the disclosed invention. FIG. 2 illustrates a perspective cut of FIG. 1 and FIG. 3 illustrates a close up view of a sensor die and ferrule of the pressure sensor shown in FIGS. 1 and 2.

In general, the pressure sensor includes an optical fiber 12 disposed in part through a ferrule 14 and connected to a die, or sensor, 16 having a Fabry-Perot cavity (not shown in FIGS. 1 and 2) formed therein, the resulting assembly being structurally supported inside a collar, or housing, 18, as shown. In the embodiment shown in FIGS. 1 and 2, the optical fiber 12 is held stationary with respect to the back side of the die 16 and a ferrule 14 by use of an adhesive layer 20 disposed within and at the end of the ferrule 14 opposite to the location where the die 16 is attached to the ferrule 14. As used herein, the expression "ferrule" refers to a ring or cap attached to an object to protect against damage, splitting, or wear. More particularly, as related to an optical fiber, a ferrule is a component (usually a rigid tube) used to align and protect the stripped end of a fiber. The ferrule keeps the fibers accurately aligned within the connector. Ferrules can be made of glass, plastic, metal, glass ceramic or ceramic material. In order the closely match the coefficient of thermal expansion between the die 16 and ferrule 14, the preferred ferrule material is glass ceramic or Kovar, which is a nickel-iron ferrous alloy having compatible thermal expansion characteristic of sealing to borosilicate glass.

Figure 3:
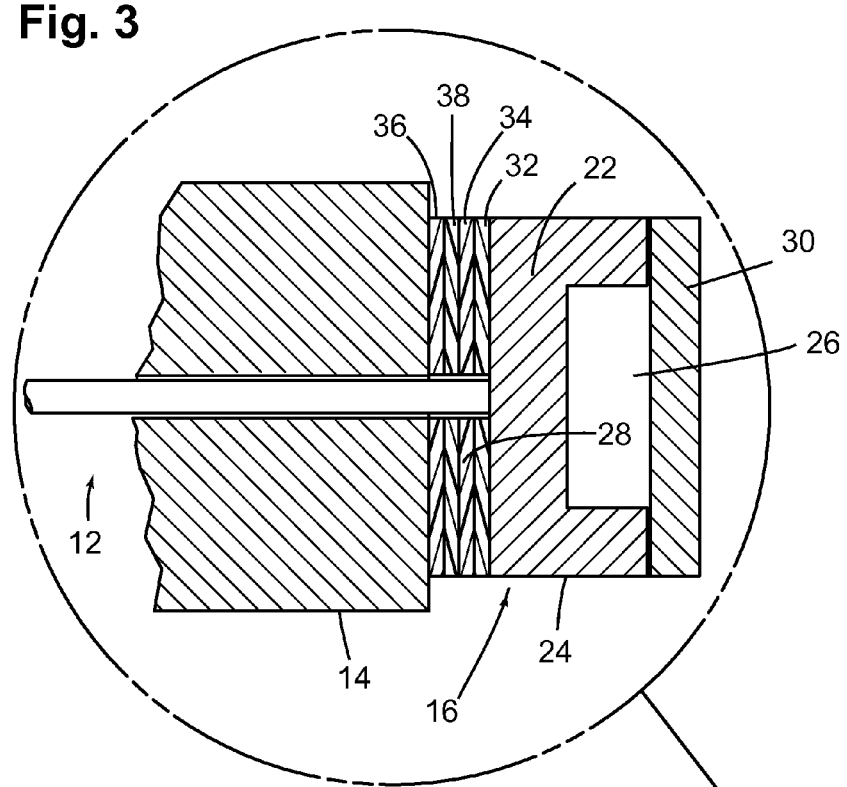
FIG. 3 illustrates a close up view of a sensor die and ferrule of the pressure sensor of FIGS. 1 and 2.

As further illustrated in FIG. 3, the die 16 includes a base 22 and a vertical wall 24 extending from the base 22 so as to form a cavity 26. The die 16 also includes a top layer 30 bonded to the base 22 through the vertical wall 24 so as to cap the cavity 26 and act as a diaphragm. The material for the top layer 30 may be selected from silicon, silicon carbide, or gallium nitride. In one embodiment, the base 22 and vertical wall 24 are fabricated from borosilicate glass by reactive ion etching a cavity on a glass wafer to form the Fabry-Perot cavity 26, which is then bonded anodically, for example, to the silicon layer forming a diaphragm. Other materials for the die 16 include sapphire, quartz or other IR or visible light transmitting materials. Layer 30 can be bonded to the base 22 through the vertical wall 24 using methods such as anodic bonding, fusion bonding, or other methods know to those competent in MEMS fabrication. The backside of the base 22 is coated with an adhesion metal layer 32 (for example, TiW, Ti, or Cr) to allow the coating of a gold layer 34 to be deposited thereon. As illustrated, the proximal end of the ferrule 14 also includes an adhesion metallic layer 36 to allow the coating of another gold layer 38 to be deposited onto the ferrule 14. As illustrated, gold layers 34 and 38 and metallic adhesion layers 32 and 36 include substantially concentric orifices that are opened during the deposition of these layers so as to allow light to travel from the optical fiber 12 through base 22 to the cavity 26 and vice-versa and the fiber to make intimate contact with the base 22 of the die 16. As understood by those of ordinary skill, patterning may be used during the deposition of the layers 32 and 34 so as to facilitate the formation of the above-described orifices. In addition, as used herein, the deposition of a gold layer implies depositing the gold layer directly onto the back surface of the die or end portion of the ferrule or onto a metallic adhesion layer there between, depending on the types of materials used for the ferrule and die. In addition, although gold has been disclosed as the material for the layers 34 and 38, those of ordinary skill in the applicable arts will understand that other materials could used as well.

As it will be explained further below, during fabrication of the pressure sensor 10, after the adhesion metallic layers 32 and 36 and gold layers 34 and 38 are deposited onto the base 22 and ferrule 14, respectively, the orifices in each of these layers are aligned and both parts are bonded together by thermo compression and the optical fiber 12 is inserted into the ferrule 14 and bonded in position so that the optical fiber 12 is in contact with the rear face of the base 22 of the die 16, this subassembly being then subsequently brazed into the housing 18, which may be customized for a particular application installation. In one embodiment, the ferrule may be brazed into the collar before the ferrule is metallized and the die is bonded, the metallization process (evaporation or sputtering) coating the braze metal to prevent it from corroding.

The dimensions and design of die 16 depend on pressure range, pressure sensitivity, burst pressure, and temperature requirements of the application. As understood by those of ordinary skill in the art, these dimensions may be modified to improve the temperature stability of the diaphragm (i.e., to reduce the effects of temperature on the strain of the diaphragm). Typical dimensions in accordance with the disclosed invention include: a thickness of the diaphragm 30 ranging from about 30 to 500 μm, a gap height of the cavity 26 being about 0.1-8 μm, a thickness of the metal layers on the bottom of the die 16 and on top of the ferrule 14 being about 0.5-4 μm, a height of the base 22 with the vertical wall 24 being approximately 0.2-1.5 mm, and a length and width of the die 16 ranging from about 0.5 to 2.0 mm.

In use, pressure applied to the layer 30 is measured by detecting the deflection of that diaphragm by detecting changes in optical path length induced by either a change in the refractive index of a light transmitted through the optical fiber 12 or a change in physical length of the cavity 26. Intensity based demodulation of light reflectance from the sensor measured by photo detectors is used to interrogate the pressure on the sensor. That is, broadband light returned from the sensor is split into narrowband and broadband signals, the broadband signal serving as reference to eliminate environment-handling disturbances. A ratio of the broadband signal to the narrowband signal is then used to correlate diaphragm deflection to pressure. Typical wavelengths of light used are approximately 850 nm, as emitted by, for example, and not a limitation, a Light Emitting Diodes (or LED). Real-time self-calibration and compensation for light source power fluctuation may be accounted for in the signal and light processing techniques used.

By miniaturizing the disclosed Fabry-Perot sensor using MEMS techniques results in more attractive sensors having substantially reduced size and manufacturing cost. In addition, the thermo compression bonding of the sensor die 16 to the metallized ferrule 14 provides a stable platform for positioning the sensor diaphragm with respect to the optical fiber capable to survive a harsh environment and to insure that the optical fiber 12 is held in alignment with the die 16. By carefully selecting the ferrule material, differences in coefficients of thermal expansion between the ferrule 14 and die 16 are minimized, thus minimizing variations in the stress state of the optical cavity 26 as a function of temperature, thereby eliminating, or substantially reducing, unwanted changes in optical cavity dimensions and assuring survivability at high temperature. This effect can also be minimized by designing the diaphragm size (diameter and thickness) so as to minimize thermal stress on the diaphragm. Another advantage of the disclosed miniature Fabry-Perot sensor is that low coherence light sources, such as light emitting diodes (or LED), can be used to generate the interferometric signal, since the optical length of the miniature cavity is of the same order as the wavelength of the light, and shorter than the coherence length of a typical LED. Another advantageous features of the Fabry-Perot sensor disclosed include remote data acquisition achieved without sacrificing signal to noise ratios. Therefore, the fiber optical pressure sensor and its packaging provide a sensor that is small and light weight so as to allow accessibility and use in harsh environments with high levels of temperature and heat radiation, passive (i.e., non-electrical) data collection, and high sensitivity and frequency response.

Figure 4:
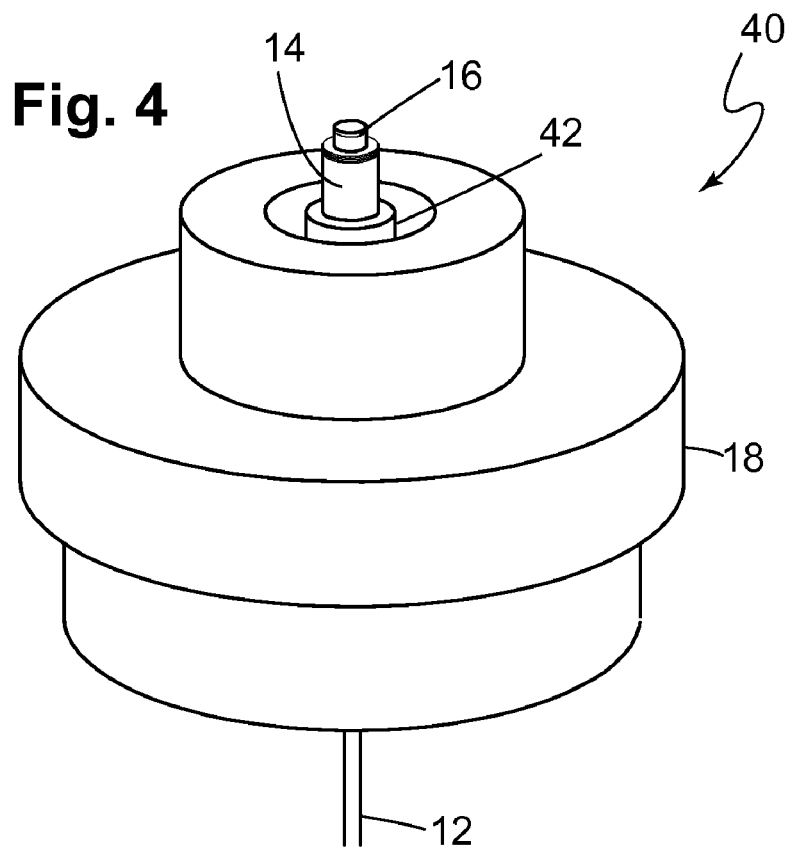
FIG. 4 illustrates a perspective view of another pressure sensor in accordance with the embodiments of the disclosed invention.
Figure 5:
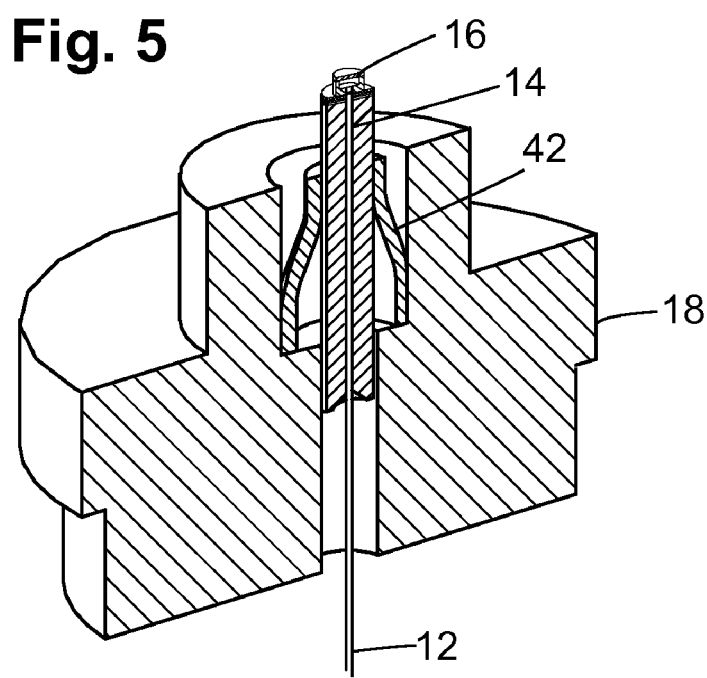
FIG. 5 illustrates a perspective cut of FIG. 4.

FIGS. 4 and 5 illustrate another embodiment of a pressure sensor 40 in accordance with embodiments of the disclosed invention. In this embodiment, in order to better support the glass ceramic ferrule 14, a strain relief brace 42 is provided. The strain relief brace 42 provides a means to reduce thermal expansion stresses between the collar 18 and the glass ceramic ferrule 14. The glass ceramic ferrule 14 is brazed to the strain relief brace 42 using an active brazing process. In one embodiment, Titanium Hydride ($TiH_2$) is applied to the glass ceramic to allowing for wetting of a braze, and braze materials, such as copper silver, may be used. In another embodiment, the braze contains an active metal such as Ti or V. The braze material is known as an Active Braze Alloy (ABA). The glass ceramic ferrule attached to the strain relief is then brazed into the collar using a lower melting point braze such as an Ag—Cu—In alloy.

Figure 6:
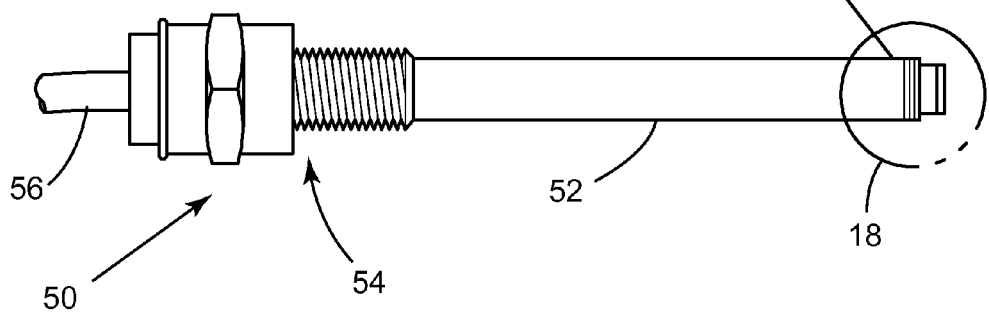
FIG. 6 illustrates an installation assembly having either the pressure sensor of FIG. 1 or FIG. 4.

An exemplary assembly of a pressure probe 50 in accordance with the disclosed invention is illustrated in FIG. 6. An advantage of the design shown is that the assembly illustrated in FIGS. 1-4 is modular and can be configured to be packaged in a variety of ways. As shown in FIG. 6, one method has the housing 18, containing the ferrule 14 and the die 16 with the optical fiber 12 attached thereto (not shown), laser welded, for example, to an extension tube 52 connected to a threaded component 54, configured to allow the pressure sensor probe to be held stationary for a particular application, and an armored cable 56 to protect the optical fiber extending from the assembly. Those of ordinary skill in the applicable arts will understand that the package illustrated in FIG. 6 is simply an exemplary embodiment. Given the small size of the pressure probe and its housing as explained, wide flexibility exits to package the pressure probe of the invention to a wide range of applications. For example, the extension tube 52 may be adjusted in length to accommodate specific applications, and the collar may be sized to accommodate specific mounting applications.

Figure 7:
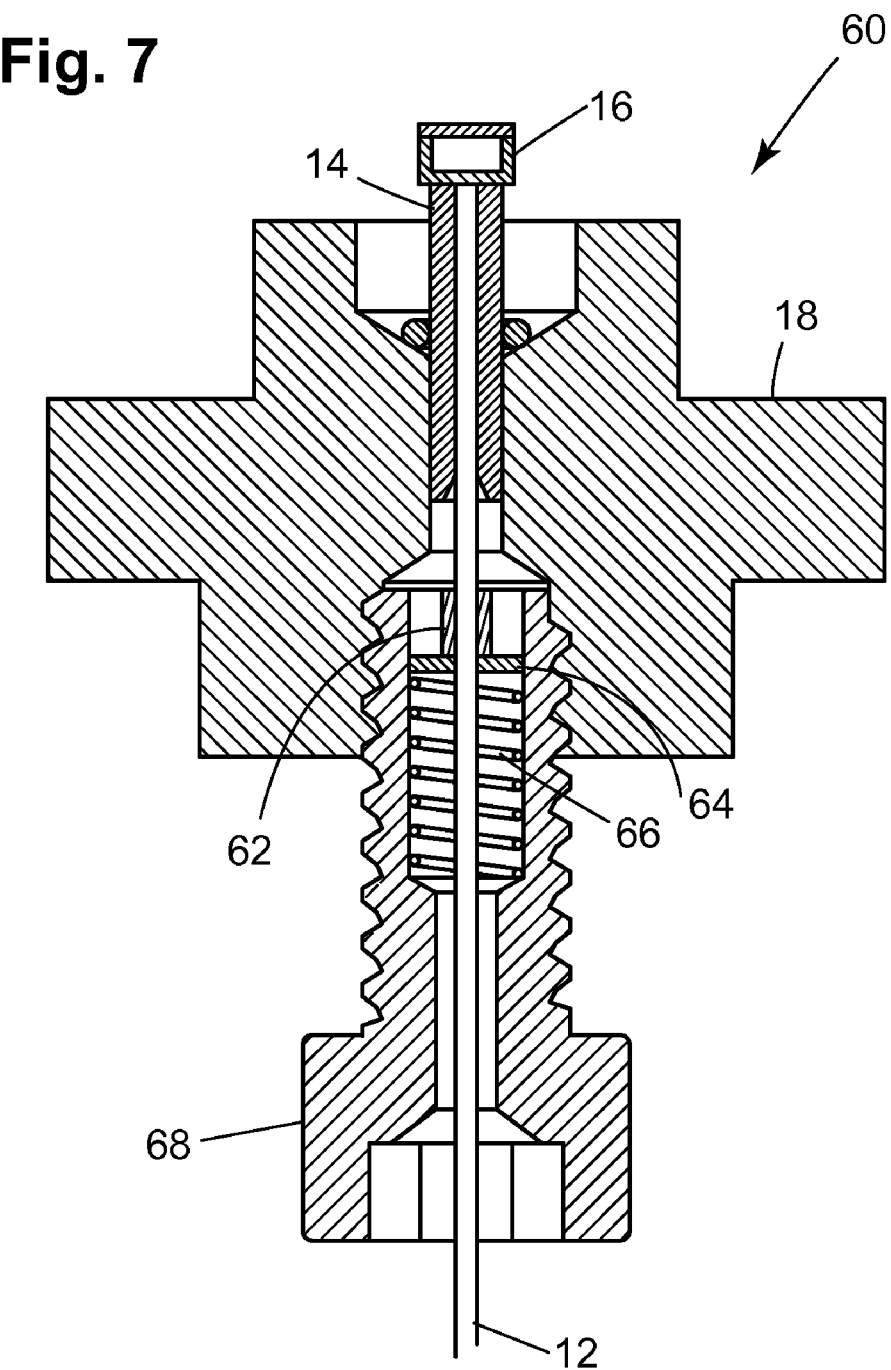
FIG. 7 illustrates a perspective view of yet another pressure sensor in accordance with the embodiments of the disclosed invention.

Another exemplary embodiment of a pressure sensor 60 according to the disclosed invention is illustrated in FIG. 7. In this particular embodiment, proper positioning of the optical fiber 12 against the die 16 is accomplished by use of a glass bead 62 disposed on a portion of the optical fiber 12. If the optical fiber 12 is metal-coated, that metallic layer may be removed from the portion of the fiber inserted in the ferrule 14 up to the point where the glass bead 62 is positioned. The glass bead 62 may be made of lead glass. A flat member 64, disposed next to the glass bead 62, is then biased upward by a biasing member 66. In this embodiment, the adhesion of the optical fiber 12 to the ferrule 14 is not required, and the biasing member 66 assures that the optical fiber 12 contacts the die 16 independently of the coefficient of thermal expansion of the ferrule 14, since the optical fiber 12 is spring-loaded against the die 16, as illustrated. In addition, the optical fiber 12 may be bonded at the exit of the threaded bolt 68 so as to provide slack within the housing and flexible conduit and to assure that the optical fiber 12 is not pulled away from die 16. The use of a high-temperature spring in the embodiment illustrated in FIG. 7 allows for extended life and overall probe stability in high-temperature environments.

Figure 8:
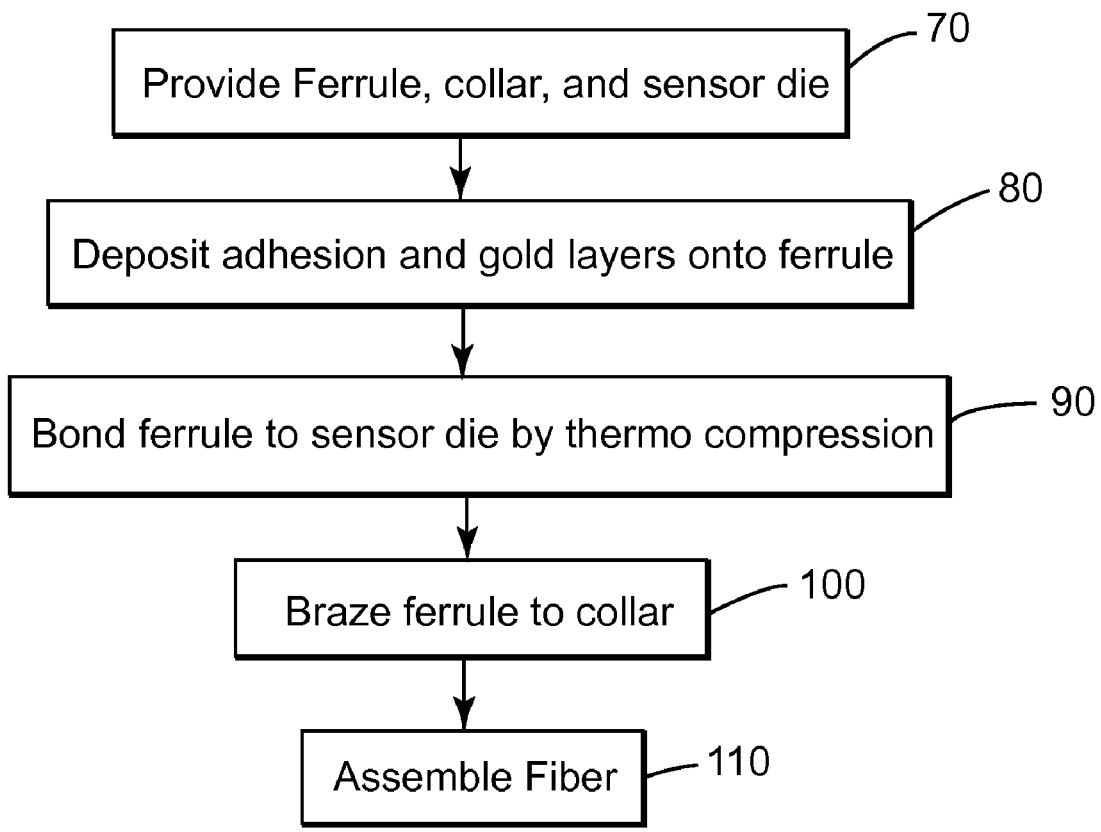
FIG. 8 illustrates a flowchart of a method for packaging a pressure transducer in accordance with the embodiments of the disclosed invention.

Methods for assembling the above-summarized pressure sensors are also within the scope of the embodiments of the invention disclosed. A generalized flowchart for such methods is illustrated in FIG. 8. As understood by those of ordinary skill in the art, based on the subject matter disclosed herein, the flowchart illustrated in FIG. 8 is simply an exemplary embodiment of the disclosed methods and does not represent that the outlined steps should be performed only in the order illustrated. For example, depending on temperature differences between two specific steps in the method, the lower temperature step may be performed subsequently to the step requiring a higher temperature. Two non-limiting illustrations on the assembly of pressure sensors according to the subject matter disclosed here will be provided below in the description of Example 1 and Example 2; therefore, clarifying and/or additional non-limiting details for the method steps disclosed herein are included in Examples 1 and 2.

In one embodiment of the disclosed method, the ferrule 14, the collar 18, and the sensor die 16 are provided at 70; the sensor die 16 being provided with layers 32 and 34 of the adhesion metallic material and gold, respectively, already deposited and patterned on the back surface thereof. As understood by those of ordinary skill, the deposition of the adhesion metallic layer 32 and gold layer 34 onto the back surface of the sensor die 16 may be performed by, for example, but not as a limitation, electroplating, evaporation, or sputtering. At 80, the layer of adhesion metallic material 36 and the layer of gold 38 are deposited onto the end of the ferrule 14, assuring that an orifice for the passage of light is provided, and over the exposed braze surfaces to prevent corrosion. Examples of adhesion materials that may be used include, but are not limited to, CoCrAlY, Cr, Ni, TiW, or Ti. Similar to the deposition made onto the sensor die 16, these layers may be deposited by, for example, but not as a limitation, electroplating, evaporation, or sputtering.

Subsequently, the end of the ferrule 14 with the gold layer 38 is bonded to the gold layer 34 on the back of the sensor die 16 by thermo compression or thermosonic bonding at 90. Before the completion of the thermo-compression bonding of these two surfaces, the orifices on the layers deposited on the back of the sensor die 16 and on the layers deposited onto the end of the ferrule 14 are aligned so as to allow light to pass to and from the sensor die 16 to the optical fiber 12 during pressure measurements. Heat and pressure are then applied to the sensor die 16 and ferrule 14 in order to complete the thermo-compression bonding. Thermosonic energy, a lower heat, and pressure are applied to the sensor die 16 and ferrule 14 in order to complete the thermosonic bonding. At 100, the end of the ferrule 14 distal from the sensor die 16 is then brazed to the collar 18 and the brazed area is subsequently tested for leaks.

At 110, either a metal-coated or standard optical fiber 12 is inserted into the ferrule 14. If a metal-coated fiber is used, the metal coating on the fiber is first stripped in a cleaning solution, for example, a ferric chloride solution, and cleaved using a cleaving tool at a distance from the jacket equal to the distance from the top of the ferrule 14 to the base of the collar 18 so as to provide an indication of full fiber insertion during assembly. Once inserted, the fiber may be held in place by use of a properly cured high temperature adhesive 20 around the location of fiber entrance into the assembly, as shown in FIG. 2, or by use of the biasing member 66 to bias the glass bid 62 deposited on the fiber toward the back of the sensor die 16, as shown in FIG. 7. The assembled pressure sensor with optical fiber disposed on the collar is then welded to a support designed for the particular application, as shown in FIG. 6.

EXAMPLE 1

Based on the procedures summarized hereinabove in accordance with the disclosed invention, a pressure sensor as illustrated in FIGS. 1-5 was produced and tested. First, a Kovar ferrule subassembly was brazed to a stainless steel collar by first making one toroid out of a 15-mil Palcusil-10 wire with an inside diameter of about 0.043 in and subsequently sanding the entrance end of the ferrule and 10 mils from the end with a 400-grit paper to remove Ni/Au finish around the top of the countersink, thus preventing braze from wicking into the entrance hole. The ferrule was then placed into the drilled hole with the counter sink end leading into the collar and a braze ring was placed over the ferrule and pressed them into the gap between the strain relief and the collar hole, the resulting assembly being brazed at 860° C. for 5 minutes at temperature in a hydrogen atmosphere and leak tested.

In order to metallize the end of the ferrule proximal to the die, the brazed collar fixture is installed in a fiber-polishing device and an arm thereof was positioned so that the ferrule tip just touched a grinding paper. After grinding the ferrule until a planar surface was obtained, the collar was sequentially cleaned for five-minute intervals in high-grade toluene, acetone, and methanol and subsequently blown dry with air or nitrogen. A metal evaporation step was then performed after cleaning the collar in an ultrasonic cleaner and baking the collar at 600° C. for thirty minutes. After placing the collar in an evaporator, a back-sputter etch was performed so as to evaporate 500A Ni and 3 μm Au without breaking vacuum.

The resulting collar was then bonded to the pressure sensor die by first placing an index mark and serial number on the collar to be used later for orientation, measuring the height of the assembly from the tip of the ferrule to the base of the collar, and recording this value along with the serial number for use during fiber attachment. The collar-ferrule assembly and die were ultrasonically cleaned in solvent in order to remove contaminates and the collar was placed onto the bonding stage with the orientation mark facing forward, and, after selecting a die to bond, placing it gold side down onto the collar and heating the base with the collar to 400° C. in order to evaporate any residual methanol. The assembly was then gradually cooled down, limiting any dust accumulation on the ferrule surface. The die was then picked up with a bonding tool and checked to assure that the bonding force corresponded to a bonding load of 20 N. Subsequently, the orifice in the die was aligned to the ferrule by matching the hole pattern on the metal layer on the back of the die to the hole in the ferrule, cutting and holding a piece of medium pressure paper over the ferrule, lowering the die onto the ferrule to apply pressure to the paper, making a note of the paper orientation with respect to the orientation mark on the collar, raising the die off the ferrule, and examining the pressure pattern under a microscope. Afterward, three leveling screws were adjusted on the bonding stage to compensate for non-planarity of the ferrule surface detected by the pressure paper and repeating this process until the pressure was uniform. As understood by those of ordinary skill in the applicable arts, a thermo compression bonder may not need this alignment step if it has another planarity compensation method. Once alignment was achieved, a fiber-bonding device was set and allowed to come to steady state operation. Subsequently, the die was lowered to the ferrule and bonded by applying pressure at an elevated temperature. After allowing the collar to cool, it was removed from the stage and the shear strength of the die on the ferrule was tested to assure that it was up to 50 grams.

In the process of attaching a standard fiber to the bonded assembly, a syringe was loaded with an adhesive and equipped with an 18-gage needle. The fiber was prepared by stripping an end thereof using a bath of ferric chloride solution prepared in a quantity proportional to 4 oz of ferric chloride to 16 oz of water and heated to 45° C. with constant stirring. An electroplating tape was applied to the end of the fiber to delineate a limit of etching and in a location to provide a desired length of fiber. The copper jacket was then subsequently stripped from the fiber by soaking the fiber in the ferric chloride solution until the copper is removed, afterward rinsing the fiber thoroughly with running water and dry. Subsequently, the end of the fiber was cleaved using a fiber-cleaving tool at a distance from the jacket equal to the distance from the top of the ferrule to the base of the collar, so as to provide an indication of full fiber insertion, and its end inspected under a microscope for quality of the cleaved end. The fiber was then inserted into the entrance of the collar until resistance was felt and the mark indicated full insertion. At that point, a bead of the adhesive was dispensed around the fiber entrance and the fiber was moved slightly in and out to help work the adhesive into the desired areas. Subsequently the collar and fiber were placed into the bonding fixture slightly off alignment with the fiber clamp, the fiber was clamped in the fiber clamp, and the collar was slid in alignment so as to exert compression on the fiber against the ferrule, while allowing the OF-380 adhesive to setup at room temperature for 2 hours followed by a heat cure in a convection oven for 450° F. (232° C.) for 45 minutes. Alternatively, the cure could include room temperature for 1 hour followed by a heat cure at 200° F. (93° C.) for 30 minutes and 450° F. (232° C.) for 30 minutes.

After laser welding the assembly together, i.e., welding the sensor to the support assembly, as shown in FIG. 6, a bath of ferric chloride solution in a quantity proportional to 4 oz of ferric chloride to 16 oz of water was prepared and heated to 80° C. with constant stirring. A piece of electroplating tape was applied two inches from the fiber end and the copper jacket was stripped from fiber by soaking the fiber in the ferric chloride solution up to the electroplating tape until the copper is removed (<5 minutes). A conduit was then cut 1 in shorter than the exposed fiber cladding, i.e., 1 in short of the distance from the bold counter bore depth to the end of the fiber cladding. A hole was drilled through the conduit with a #23 drill bit, ⅜ in from the conduit end for a #6-32 socket head cap screw for use with the fiber connector collar. Additional holes were drilled and tapped for a #6-32 hole at 90 degrees in the bolt counter bore. The fiber was then fed into a stainless steel or plastic tubing as a guide through the conduit and the conduit was slid over the tubing and fastened to the bolt using #6-32×0.125" socket set screws and subsequently removing the tubing from the conduit so as to leave the fiber threaded through the conduit. The free end of the fiber was threaded through the fiber connector collar and fastened to the conduit using #6-32 socket head cap screws while an optical fiber connector was attached to the free end of the fiber so as to allow some slack to permit connection. Finally, the optical connector was inserted into the connector collar pushing the fiber back into the conduit and the connector was fastened to the collar using #6-32×0.125" socket set screws.

EXAMPLE 2

Based on the procedures summarized hereinabove in accordance to the disclosed invention, a pressure sensor as illustrated in FIGS. 7 was produced and tested. The steps of ferrule-to-collar braze, ferrule metallization, die-to-ferrule thermo-compression bonding, laser-welding assembly, and final assembly are similar to the ones disclosed with Example 1 and will not be repeated here.

In attaching the optical fiber cable, a glass bead was disposed on a metal-coated optical fiber a position about 3 in from the end thereof and the excess fiber was coiled up and placed onto a setter tile. The glass bead was molten by placing the setter tile into a furnace and heating the same in nitrogen atmosphere. The bead length in this particular example measured approximately 1.0 mm in length. A bath of ferric chloride solution was then prepared in a quantity proportional to 4 oz of ferric chloride to 16 oz of water and heated to 80° C. with constant stirring. Next, electroplating tape was applied to the glass bead to delineate a limit of etching and the fiber was cut 1 in from the bead to allow enough for cleaver. The copper jacket was then stripped from fiber by soaking the fiber in the ferric chloride solution up to the electroplating tape and until the copper is removed (<5 minutes) and the fiber was rinsed thoroughly with running water and dried.

The stripped fiber was then aligned in the fiber-cleaving tool so that the center of the glass bead was aligned with the elastomer edge, cleaved so that the resulting fiber measured approximately 5.0 mm in length from the bead to the fiber end, and under a microscope for quality of the cleaved end. Subsequently, a 4-40 vented screw 0.09-in deep was counter bored using a #51 drill bit (0.067 in diameter) and the resulting opening was chamfered using a #35 (0.110 in) drill bit. A stainless steel washer was then strung from the long end of the fiber to the glass bead, the washer diameter through its thickness having a taper from the etching process and being placed with the narrow end of the washer facing toward the glass bead. Next, a heat-resistant spring was inserted, or strung, from the long end of the fiber to the washer followed by the 4-40 screw from the long end of the fiber to the spring. The stripped end of the fiber was then inserted into the ferrule-tapered end and the 4-40 screw was carefully screwed into the collar while capturing the spring in the screws counter bore.

The above-summarized disclosure results in pressure sensors capable of measuring pressures of up to 350 bar (absolute) with temperature variations of the sensor die from about −50 to about 350° C., accuracy of ±0.5% FSO, pressure signal linearity of less than 0.5% FSO, frequency response (−3 dB) of up to 12000 Hz, resonant frequency of more than 20000 Hz, and shock resistance greater than 2000 g as measured using an impact or drop test.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

In addition, while the present invention has been shown in the drawings and fully described above with particularity and detail in connection with what is presently deemed to be practical and several of the preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. A method for assembling a Fabry-Perot interferometer, the method comprising:
    depositing a first metal layer on an end portion of a ferrule, the first metal layer comprising a first orifice;
    depositing a second metal layer on a back portion of a die, the second metal layer comprising a second orifice;

placing the first metal layer and the second metal layer in contact with each other and aligning the first and second orifices with respect to each other;

bonding the ferrule to the die;

brazing the other end potion of the ferrule to a collar; and inserting an optical fiber through the other end of the ferrule, an end of the optical fiber being disposed directly adjacent to the back portion of die and aligned with the first orifice.

2. The method of claim 1, wherein the bonding comprises bonding the ferrule to the die by thermo compression.

3. The method of claim 1, wherein the bonding comprises thermosonically bonding the ferrule to the die.

4. The method of claim 1, further comprising:

depositing an adhesive to the fiber and the other end of the ferrule so as to prevent motion of end of the fiber relative to the back portion of the die.

5. The method of claim 4, further comprising:

welding the collar to a support assembly.

6. The method of claim 1, further comprising:

depositing a glass bead onto the optical fiber; and applying a force on the glass bead so as to bias the optical fiber toward the back portion of the die.

7. The method of claim 6, wherein applying the force comprises applying a spring force onto a washer in contact with the glass bead.

8. The method of claim 6, further comprising:

welding the collar to a support assembly.

9. The method of claim 1, further comprising:

inserting a strain relief brace between the ferrule and the collar.

10. The method of claim 9, wherein the ferrule is made of a nickel-cobalt ferrous alloy having thermal expansion characteristics substantially the same as those of borosilicate glass, a ceramic, or a glass ceramic.

11. A method for assembling a Fabry-Perot interferometer, the method comprising:

depositing a first metal layer on an end portion of a ferrule, the first metal layer comprising a first orifice;

depositing a second metal layer on a back portion of a die, the second metal layer comprising a second orifice;

placing the first metal layer and the second metal layer in contact with each other and aligning the first and second orifices with respect to each other;

bonding the ferrule to the die; and before depositing the first and second metal layers, depositing first and second metallic adhesion layers onto the end portion of the ferrule and the back portion of the die, respectively, both first and second metallic adhesion layers comprising orifices aligned with the first and second orifices.

12. A Fabry-Perot interferometer, comprising:

a glass die having a body containing a cavity with an opening and a first metal layer disposed on a back portion of the die, the first metal layer including a first orifice;

a diaphragm disposed over the opening of the cavity, the diaphragm being bonded to the glass die;

a ferrule having a second metal layer with a second orifice disposed on a first end portion of the ferrule, the ferrule being bonded to the glass die with the first orifice aligned with the second orifice;

a collar brazed to the other end portion of the ferrule; and an optical fiber having an end portion inserted through the other end of the ferrule, the end portion of the optical fiber being disposed directly adjacent to the back portion of the die and aligned with the first orifice.

13. The Fabry-Perot interferometer of claim 12, wherein the diaphragm is made of a material selected from the group consisting of silicon, silicon carbide, and gallium nitride diaphragm.

14. The Fabry-Perot interferometer of claim 12, wherein the ferrule is bonded to the glass die by thermo compression.

15. The Fabry-Perot interferometer of claim 12, wherein the ferrule is thermosonically bonded to the glass die.

16. The Fabry-Perot interferometer of claim 12, further comprising:

an adhesive attaching the fiber to the other end of the ferrule so as to prevent motion of the fiber relative to the back portion of the die.

17. The Fabry-Perot interferometer of claim 12, further comprising:

a glass bead disposed onto the optical fiber; and a biasing member applying a force on the glass bead so as to bias the optical fiber toward the back portion of the first metal layer.

18. The Fabry-Perot interferometer of claim 12, further comprising:

first and second metallic adhesion layers disposed onto the end portion of the ferrule fund the back portion of the die, respectively, both first and second metallic adhesion layers comprising orifices aligned with the first and second orifices.

19. The Fabry-Perot interferometer of claim 12 further comprising:

a strain relief brace disposed between the ferrule and the collar.

20. The Fabry-Perot interferometer of claim 19, wherein the ferrule is made of a glass ceramic, a ceramic, or a nickel-cobalt ferrous alloy having thermal expansion characteristics substantially the same as those of borosilicate glass.

21. The Fabry-Perot interferometer of claim 12, wherein the ferrule is made of a glass ceramic, a ceramic, or a nickel-cobalt ferrous alloy having thermal expansion characteristics substantially the same as those of borosilicate glass.

22. The Fabry-Perot interferometer of claim 12, further comprising:

a support assembly, the collar being welded to the support assembly.

* * * * *

UNITED STATES PATENT AND TRADEMARK OFFICE
CERTIFICATE OF CORRECTION

PATENT NO. : 7,559,701 B2
APPLICATION NO. : 11/687931
DATED : July 14, 2009
INVENTOR(S) : Knobloch et al.

It is certified that error appears in the above-identified patent and that said Letters Patent is hereby corrected as shown below:

In Column 9, Line 20, delete "OF-380" and insert -- FO-380 --, therefor.

In Column 12, Line 35, in Claim 18, delete "fund" and insert -- and --, therefor.

Signed and Sealed this

First Day of September, 2009

David J. Kappos
*Director of the United States Patent and Trademark Office*